(12) United States Patent
Wyman et al.

(10) Patent No.: US 10,055,883 B2
(45) Date of Patent: Aug. 21, 2018

(54) FRUSTUM TESTS FOR SUB-PIXEL SHADOWS

(71) Applicant: NVIDIA Corporation, Santa Clara, CA (US)

(72) Inventors: Christopher Ryan Wyman, Redmond, WA (US); Aaron Eliot Lefohn, Kirkland, WA (US); Anjul Patney, Kirkland, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 240 days.

(21) Appl. No.: 14/989,585

(22) Filed: Jan. 6, 2016

(65) Prior Publication Data

US 2016/0203635 A1 Jul. 14, 2016

Related U.S. Application Data

(60) Provisional application No. 62/101,324, filed on Jan. 8, 2015.

(51) Int. Cl.
*G06T 15/60* (2006.01)
*G06T 15/50* (2011.01)
*G06T 15/80* (2011.01)

(52) U.S. Cl.
CPC ........... *G06T 15/60* (2013.01); *G06T 15/503* (2013.01); *G06T 15/506* (2013.01); *G06T 15/80* (2013.01)

(58) Field of Classification Search
None
See application file for complete search history.

(56) References Cited

U.S. PATENT DOCUMENTS

| | | | | |
|---|---|---|---|---|
| 2003/0112237 A1* | 6/2003 | Corbetta | ................. | G06T 15/60 345/426 |
| 2004/0169651 A1* | 9/2004 | Everitt | ................... | G06T 15/60 345/426 |
| 2011/0249011 A1* | 10/2011 | Lalonde | .................... | G06T 1/20 345/522 |
| 2015/0310660 A1* | 10/2015 | Mogilefsky | ............. | G06T 13/40 345/422 |
| 2016/0005213 A1* | 1/2016 | Lecocq | ................... | G06T 15/60 345/419 |
| 2016/0125642 A1* | 5/2016 | Zhu | ......................... | G06T 15/60 345/421 |

OTHER PUBLICATIONS

Aila T. et al., "Alias-Free Shadow Maps," Eurographics Symposium on Rendering, Jun. 2004, pp. 1-6.
(Continued)

*Primary Examiner* — James A Thompson
(74) *Attorney, Agent, or Firm* — Zilka-Kotab, P.C.

(57) ABSTRACT

A method, computer readable medium, and system are disclosed for rendering shadows. A frustum projected from a grid cell corresponding to a light source in light-space is defined and a graphics primitive is determined to intersect the frustum. A light-space visibility buffer is accessed to obtain a set of pixel fragment footprints corresponding to the frustum and it is identified whether each pixel fragment footprint of the pixel fragment footprints is shadowed by the graphics primitive.

20 Claims, 15 Drawing Sheets

(56) References Cited

OTHER PUBLICATIONS

Pan, M. et al., "Fast, Sub-pixel Antialiased Shadow Maps," Computer Graphics Forum, vol. 28, No. 7, Oct. 2009, pp. 1927-1934.
Sintorn, E. et al., "Sample Based Visibility for Soft Shadows using Alias-free Shadow Maps," Eurographics 2008, vol. 27, No. 4, 2008, pp. 1-8.
Arvo, J., "Alias-Free Shadow Maps using Graphics Hardware," Journal of Graphics Tools, 2007, vol. 12, No. 1, pp. 47-59.
Johnson, G. et al. "The Irregular Z-Buffer: Hardware Acceleration for Irregular Data Structures," ACM Transactions on Graphics, Oct. 2005, vol. 24, No. 4, pp. 1462-1482.

\* cited by examiner

FRUSTUM TESTS FOR SUB-PIXEL SHADOWS

CLAIM OF PRIORITY

This application claims the benefit of U.S. Provisional Application No. 62/101,324 titled "Fustrum Tests For Sub-Pixel Shadows," filed Jan. 8, 2015, the entire contents of which is incorporated herein by reference.

FIELD OF THE INVENTION

The present invention relates to three-dimensional graphics, and more particularly to rendering shadows.

BACKGROUND

The ability to efficiently render anti-aliased shadows is important to produce realistic and high-quality images. Rendering anti-aliased hard shadows is complex and often presents a heavy computational workload to a graphics processor. Conventional shadow volume techniques generate pixel-accurate shadows by constructing and testing the boundary of shadowed regions. Rendering the invisible shadow volumes consumes significant computing resources. Conventional shadow map techniques present a lower workload, but the regular sampling of visibility causes spatial and temporal aliasing. Thus, there is a need for addressing these issues and/or other issues associated with the prior art.

SUMMARY

A method, computer readable medium, and system are disclosed for rendering shadows. A frustum projected from a grid cell corresponding to a light source in light-space is defined and a graphics primitive is determined to intersect the frustum. A light-space visibility buffer is accessed to obtain a set of pixel fragment footprints corresponding to the frustum and it is identified whether each pixel fragment footprint of the pixel fragment footprints is shadowed by the graphics primitive.

DETAILED DESCRIPTION

Anti-aliased hard shadows may be rendered in a real-time using irregular z-buffers (IZBs). In one embodiment, 32 samples per pixel are used for sub-pixel accuracy, at roughly twice the computational cost of using a single sample. The irregular z-buffer shadow rendering technique imposes no constraints on light, camera or geometry, allowing fully dynamic scenes without precomputation. Unlike conventional shadow map techniques, no spatial or temporal aliasing is introduced, and sub-pixel shadows from grass or wires may be smoothly animated. Shadow mapping uses a light-space z-buffer; IZBs instead use a light-space buffer, with each texel in the light-space buffer storing references all pixels potentially occluded by geometry in the particular texel. In one embodiment, each texel stores a linked list of the pixels.

Figure 1A:
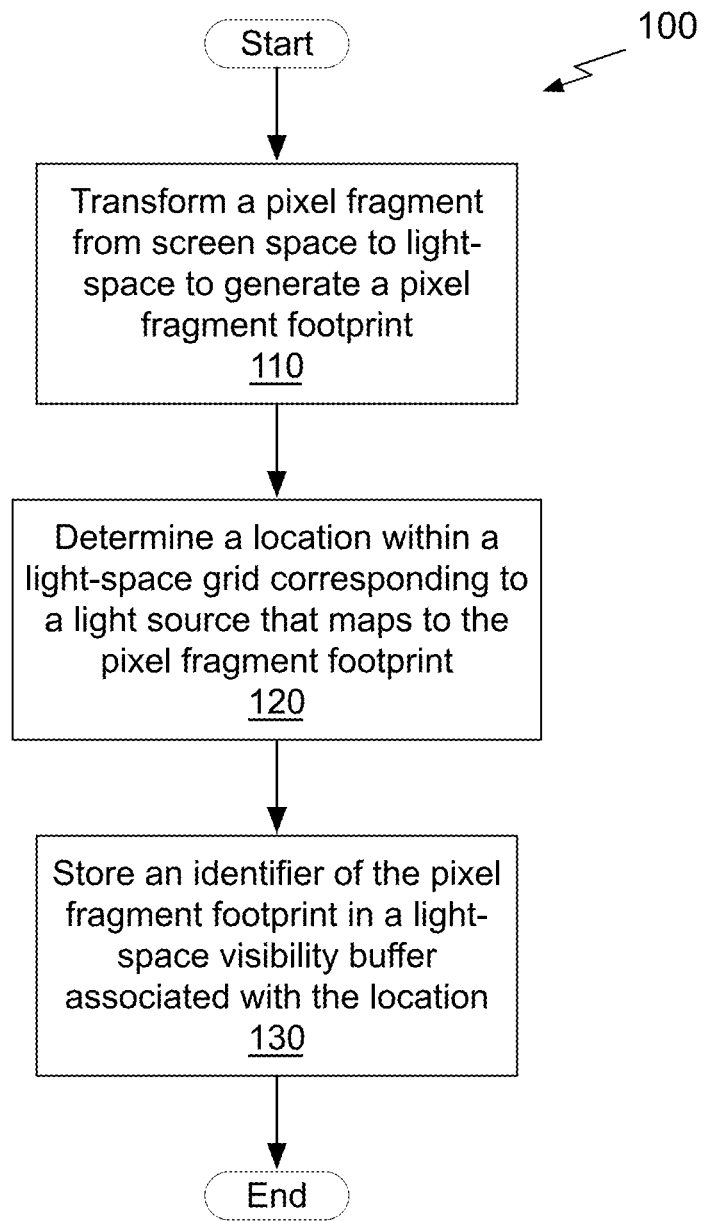
FIG. 1A illustrates a flowchart of a method for generating a light-space visibility buffer, in accordance with one embodiment.

FIG. 1A illustrates a flowchart of a method 100 for generating a light-space visibility buffer, in accordance with one embodiment. A light-space visibility buffer is associated with a two-dimensional light-space grid corresponding to a light source in a scene. For each grid cell in the light-space grid, the light-space visibility buffer stores a set of rendered pixel fragments that cover the grid cell when projected from screen-space into light-space. 3D graphics primitives in the scene are rendered to produce a 2D image in screen-space. A pixel fragment is an intersection of a graphics primitive and the screen-space pixel (i.e., the portion of the screen-space pixel that is covered by the graphics primitive). In one embodiment, the identifier is a position of the screen-space pixel or a pointer to the screen-space pixel. In the context of the following description, the pixel fragment is an intersection of a graphics primitive and the screen-space pixel (i.e., the portion of the screen-space pixel that is covered by the graphics primitive). In the context of the following description, rendered pixel fragments are pixels having at least one sample location within the pixel that is covered by a graphics primitive.

At step 110, a pixel fragment is transformed from screen-space to light-space to generate a pixel fragment footprint. In one embodiment, the pixel fragment that is transformed is the entire pixel including all of the samples within the pixel. At step 120, a location within a grid cell within a light-space grid corresponding to a light source is determined that maps to the pixel fragment footprint. In one embodiment, a light ray is projected from the pixel fragment footprint to the grid cell within the light-space grid. The point in the light-space grid that is intersected by the light ray is a light sample. In one embodiment, a three-dimensional frustum is defined by the grid cell and a base of the frustum is formed by the pixel fragment footprint.

At step 130, an identifier of the pixel fragment footprint is stored in a light-space visibility buffer associated with the location. One or more pixel fragment footprint identifiers may be stored in a location of the light-space visibility buffer that is associated with one grid cell. In one embodiment, the identifier is a position of the screen-space pixel or a pointer to the screen-space pixel that was transformed to generate the pixel fragment footprint. In one embodiment, the light-space grid represents a visibility map and a grid cell stores an index to a list of pixel fragment footprint identifiers. In one embodiment, a set of screen-space pixels corresponding to the frustum is specified by one or more identifiers of the pixel fragment footprints that are stored in the location. In one embodiment, the light-space visibility buffer is an IZB that stores a set of identifiers for each grid cell, where the set of identifiers indicates pixels that are at least partially covered by a primitive that is potentially in shadow. A pixel fragment is in shadow when a graphics primitive is located between the grid cell and the pixel fragment footprint, thereby preventing the light source from reaching the pixel fragment.

Figure 1B:
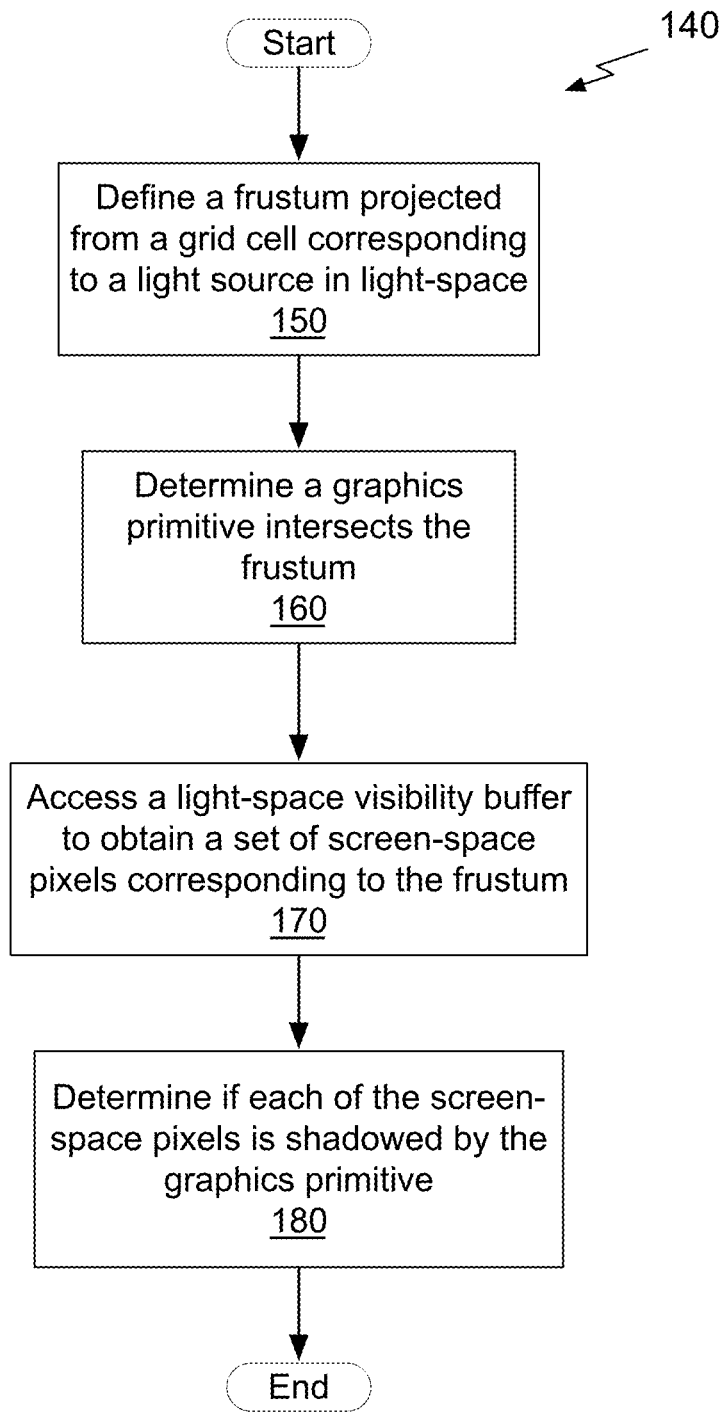
FIG. 1B illustrates a flowchart of a method for using a light-space visibility buffer to render shadows, in accordance with one embodiment.

FIG. 1B illustrates a flowchart of a method 140 for using a light-space visibility buffer to render shadows, in accordance with one embodiment. At step 150, a frustum projected from a grid cell corresponding to a light source in light-space is defined. In one embodiment, the grid cell is included in a light-space grid. At step 160, a graphics primitive is determined to intersect the frustum. In one embodiment, a graphics primitive is associated with primitive attributes as well as a plurality of vertices, each vertex having one or more vertex attributes (e.g., color, texture coordinates, normal vector, etc.). A graphics primitive that intersects the frustum may cast a shadow on one or more pixel fragments corresponding to the grid cell, where each potentially shadowed pixel fragment is associated with a pixel fragment footprint identifier.

At step 170, a light-space visibility buffer is accessed to obtain a set of pixel fragment footprints corresponding to the frustum. At step 180, it is determined if each of the pixel fragment footprints is shadowed by the graphics primitive. In one embodiment, a shadow mask buffer is updated for each pixel fragment footprints that is shadowed by the graphics primitive. The shadow mask buffer may indicate whether each sample within a screen-space pixel from which the pixel fragment footprint is generated is shadowed when multiple samples are included within each pixel.

In one embodiment, N sample locations are defined per pixel. For each graphics primitive being rendered, N color values are produced for each pixel that is fully covered by the primitive. The N color values correspond to the N sample locations. In some embodiments, each color value may also be associated with a transparency value, shadow value, and/or a depth value. The values associated with a given sample location may be written to a corresponding frame buffer at a location corresponding to the pixel. Each frame buffer may include a plurality of values included in a 2D array sized based on a resolution of a display screen (or at least a portion of the display screen). In one embodiment, a resolution of the shadow mask buffer equals a resolution of the frame buffer.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
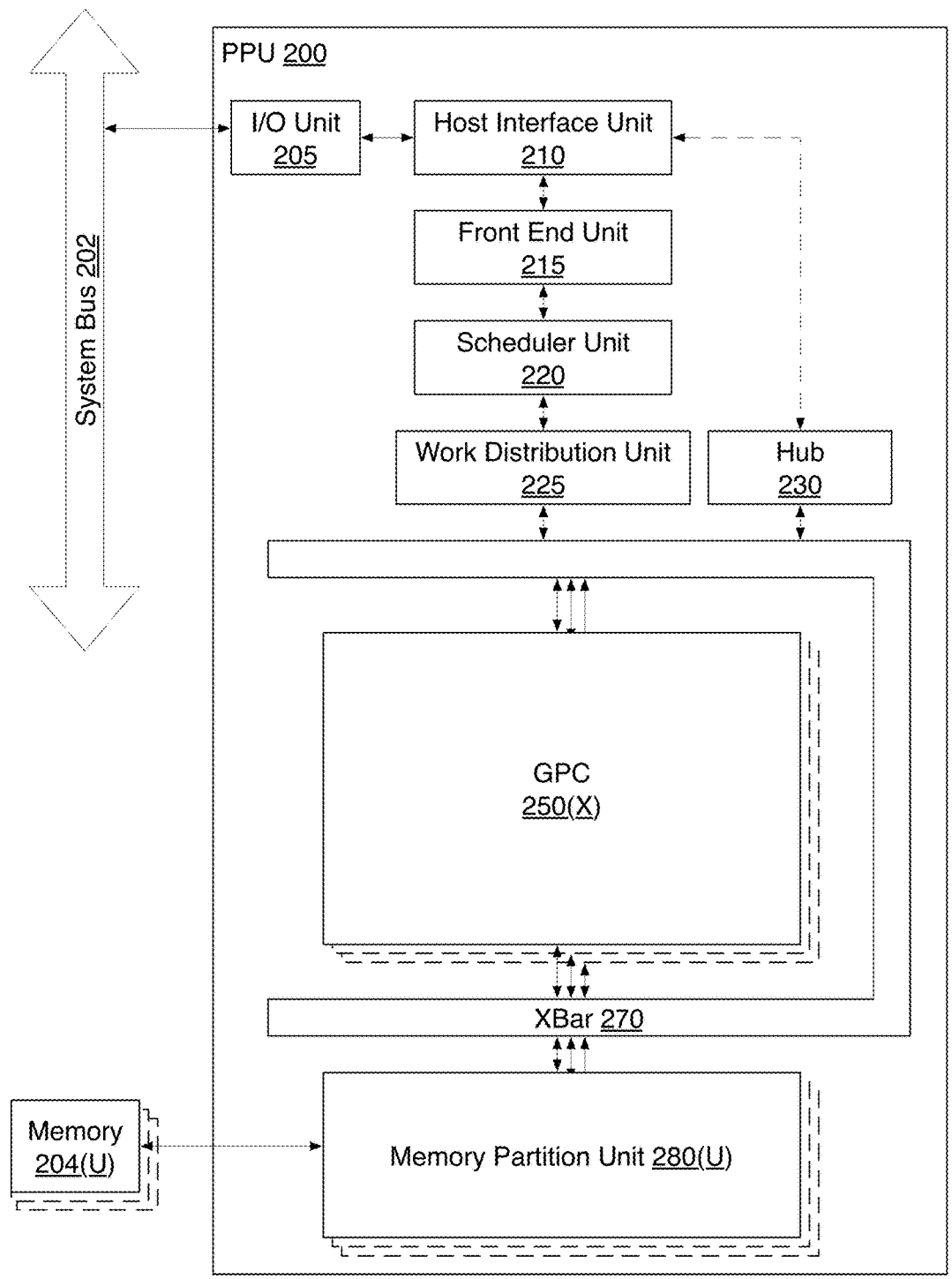
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via a XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
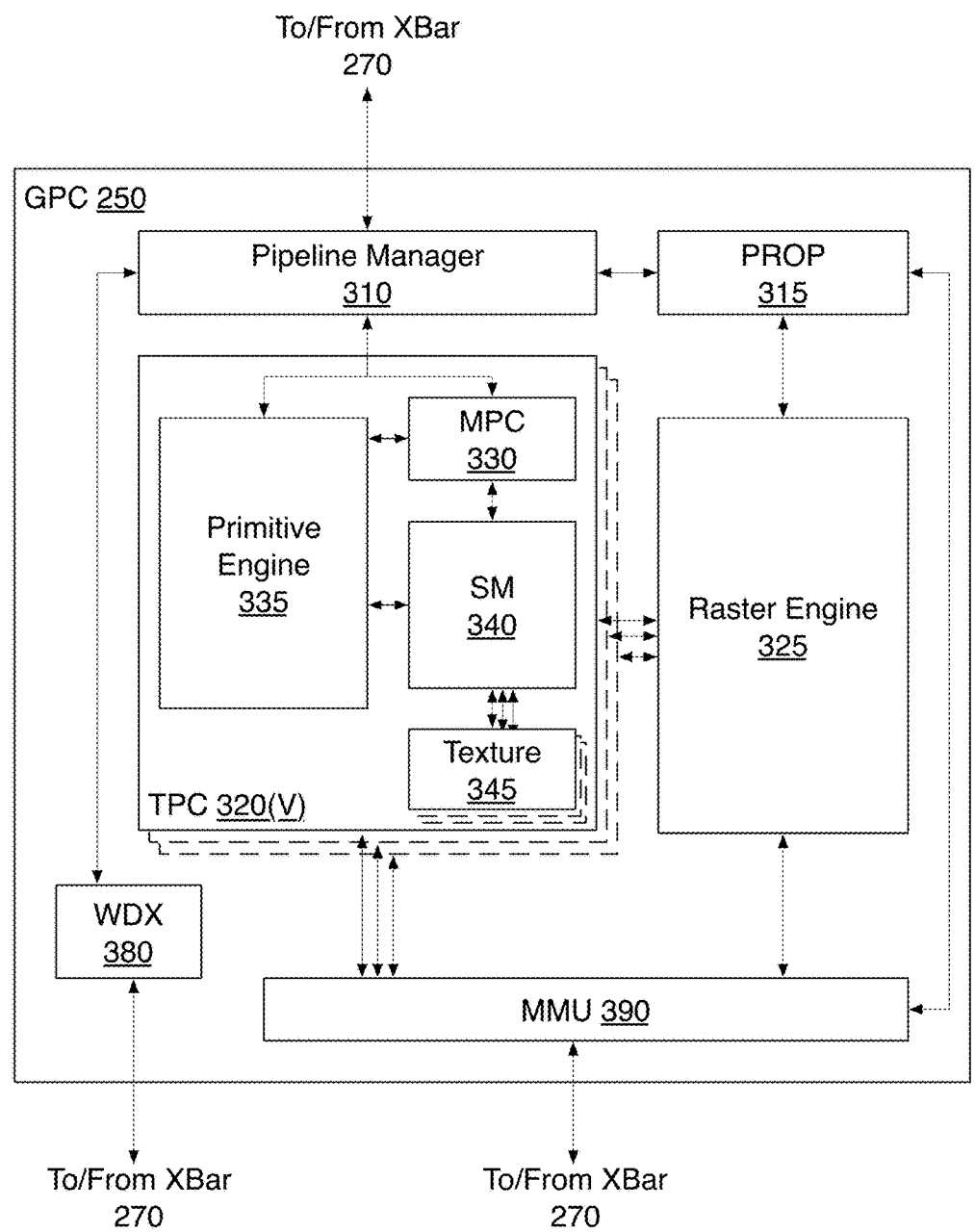
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the graphics primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes four (4) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
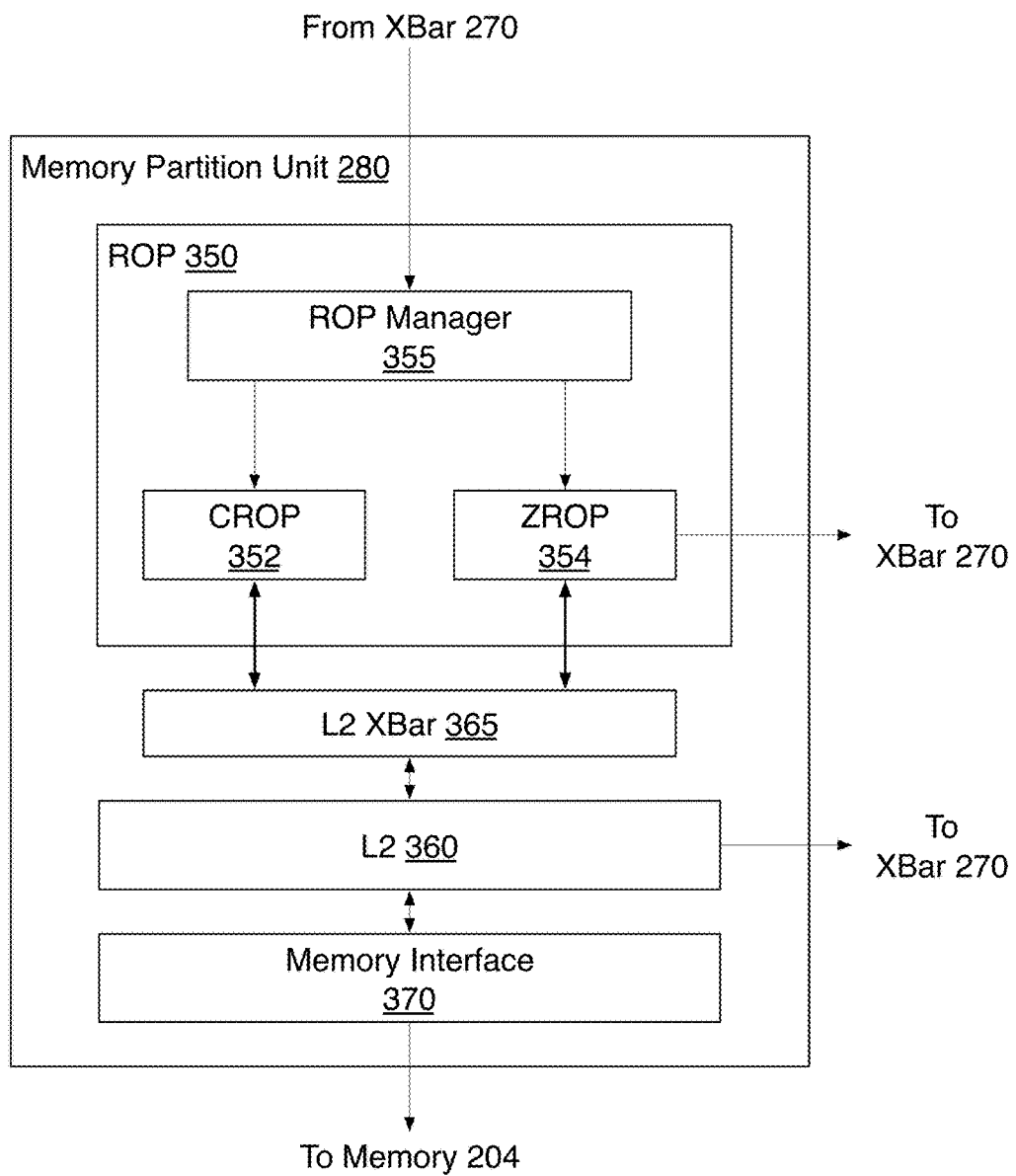
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
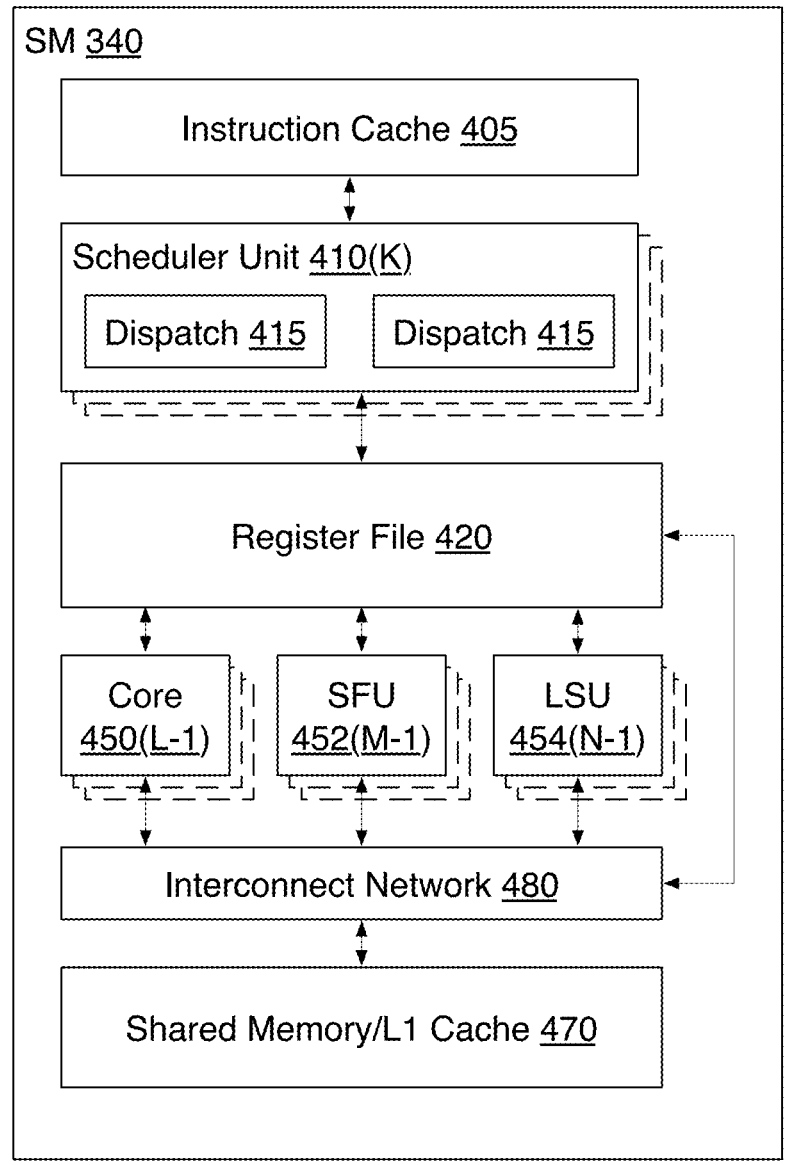
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., pixel blending operations, and the like), and N LSUs 454 that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen-space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Irregular Z-Buffer Shadow Rendering

Rendering shadows using IZBs does not produce the same artifacts as when conventional shadow mapping is used, specifically aliasing artifacts resulting from mismatches between eye-space and light-space sampling locations are reduced or eliminated. Conventional shadow maps use a regular grid of samples in both eye-space and light-space, and finding a robust bijection between samples in the eye-space and light-space remains unsolved. By allowing light-space samples to occur irregularly, an IZB enables pairing of samples in eye-space and light-space and may eliminate or reduce aliasing.

Figure 5A:
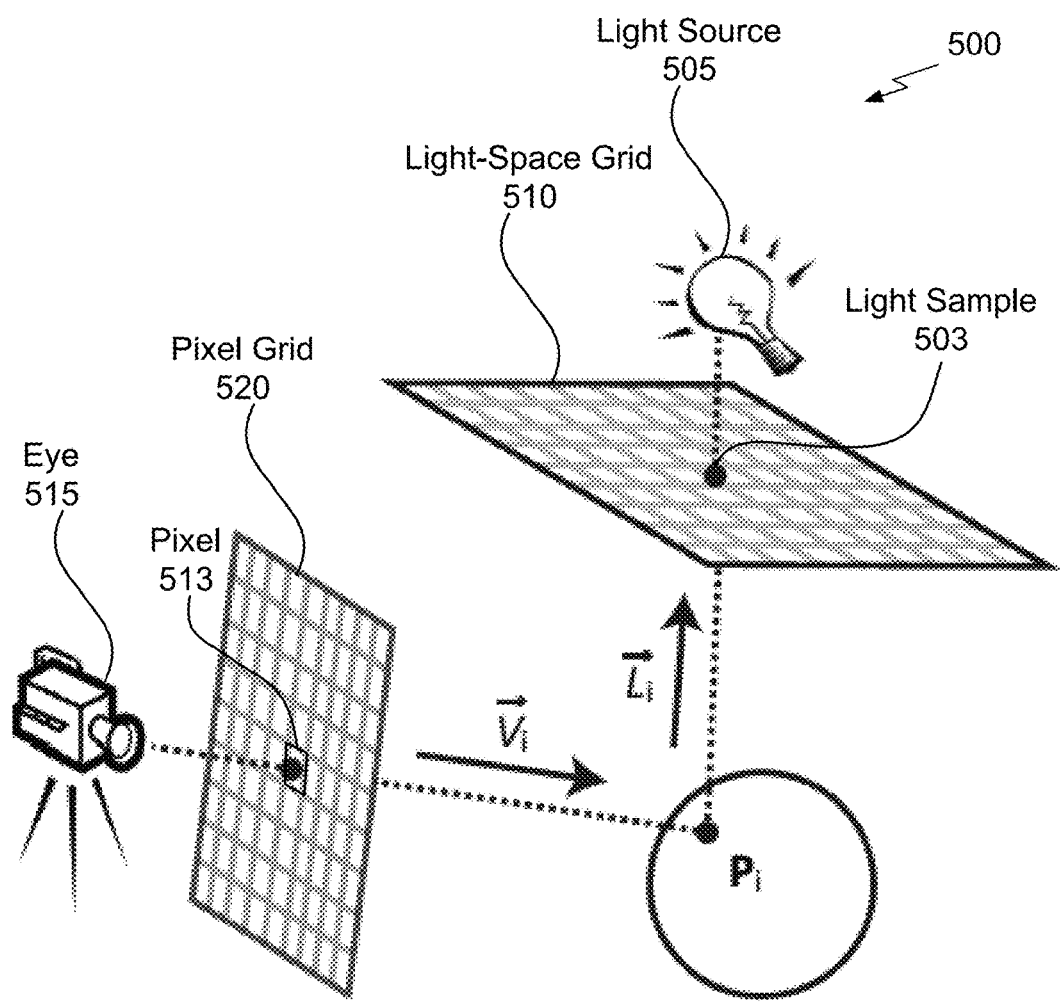
FIG. 5A illustrates a mapping of pixels to a light-space grid, in accordance with one embodiment.

FIG. 5A illustrates a mapping 500 of pixels to a light-space grid 510, in accordance with one embodiment. By construction, an IZB bijectively maps each pixel in a pixel grid 520 to one sample in light-space, thereby discretizing light-space. A pixel 513 represents pixel ray $\vec{V}_i$ from an eye 515 and intersecting a graphics primitive at sample point $\vec{P}_i$. A corresponding light sample 503 in a light-space grid 510 represents light ray $\vec{L}_i$ from $\vec{P}_i$ to the light source 505. Queries along the light ray $\vec{L}_i$ return the nearest neighbor sample on the light-space grid 510 rather than the true visibility along light ray $\vec{L}_i$, which causes aliasing in shadow mapping where the grid stores explicit visibility.

Irregular z-buffers may be configured to store the light samples of the light-space grid 510 as an IZB representing a light-space visibility buffer. Importantly, all sample points $\vec{P}_i$ that are within a grid cell of the light-space grid 510 may be stored in the light-space visibility buffer, thereby enabling computation of exact shadows. The light-space visibility buffer may be used during rendering to generate a unique visibility for each pixel in the pixel grid 520.

In theory, constructing an irregular z-buffer shadow mask is accomplished by "rasterizing" occluding geometry over the irregular set of light rays $\vec{L}_i$, finding the closest geometry along each light ray $\vec{L}_i$. If the depth of the closest geometry lies between the light and the sample point $\vec{P}_i$, the pixel 513 corresponding to the pixel ray that that intersects the sample point $\vec{P}_i$ is shadowed. In the context of the following description, shadowed means that a sample point is not directly illuminated by a light source and the sample point is only indirectly illuminated (i.e., by a reflected light ray) if the sample point is illuminated at all.

Figure 5B:
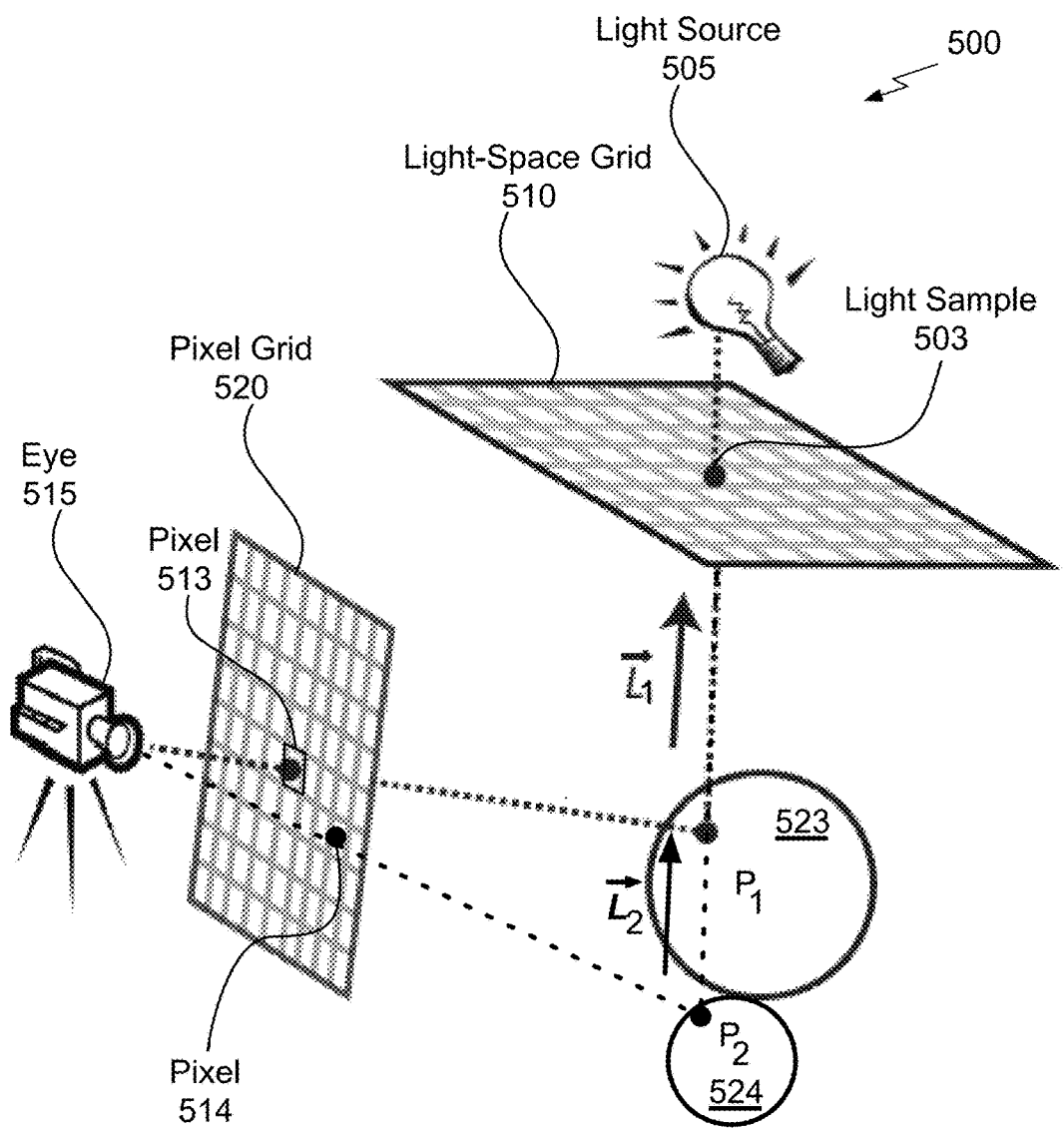
FIG. 5B illustrates a first object that occludes a second object in light-space, in accordance with one embodiment.

FIG. 5B illustrates a first object that occludes a second object in light-space, in accordance with one embodiment. A first object 523 casts a shadow onto a second object 524. The pixel 513 represents a first pixel ray from the eye 515 that intersects a first graphics primitive of the first object 523 at sample point $\vec{P}_1$ on the first graphics primitive. The corresponding light sample 503 in the light-space grid 510 represents a light ray $\vec{L}_1$ from $\vec{P}_1$ to the light source 505 that intersects the light-space grid 510 at light sample 503. A second pixel 514 represents a second pixel ray from the eye 515 that intersects a second graphics primitive of the second object 524 at sample point $\vec{P}_2$ on the second graphics primitive. The same light sample 503 in the light-space grid 510 represents a light ray $\vec{L}_2$ from $\vec{P}_2$ to the light source 505. Sample points $P_1$ and $P_2$ are both stored in the light-space visibility buffer and are associated with the grid cell that includes the light sample 503. The shadow mask queries along the light ray $\vec{L}_2$ indicate that the graphics primitives of the object 523 are closer to the light-space grid 510 than the sample point $P_2$. Therefore, the sample point $P_2$ is in shadow. Similarly, the shadow mask queries along the light ray $\vec{L}_1$ indicate that the sample point $P_1$ is closer to the light-space grid 510 than graphics primitives of the object 523. Therefore, the sample point $P_1$ is not in shadow.

Figure 5C:
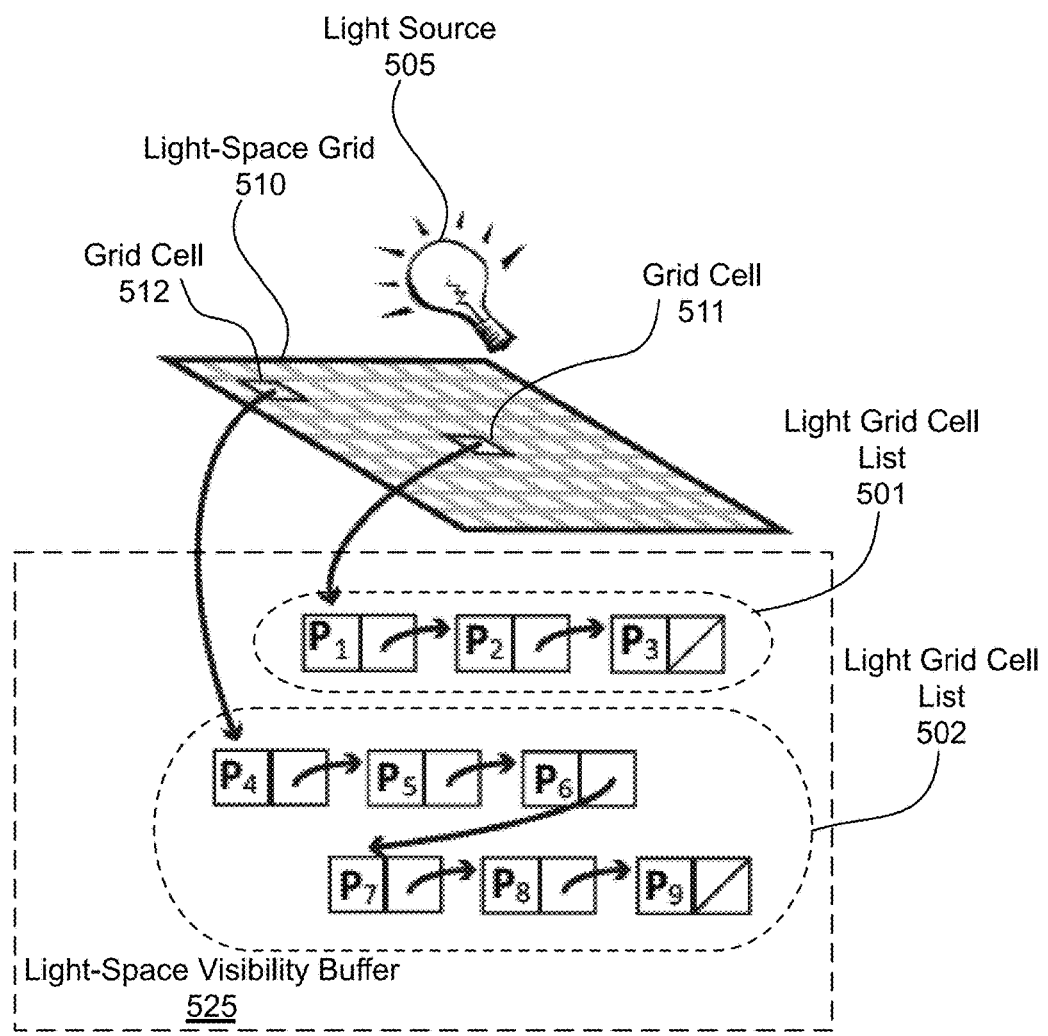
FIG. 5C illustrates the light-space grid and a light-space visibility buffer encoded as an IZB, in accordance with one embodiment.

FIG. 5C illustrates the light-space grid 510 and a light-space visibility buffer 525 that is encoded as an irregular Z-buffer (IZB), in accordance with one embodiment. Since modern GPUs rasterize only over regular, consistently sized screen-space samples, the irregular sets of pixel fragment footprints are stored separately from the pixel data (e.g., per-pixel attribute data such as color, depth, texture coordinates, etc.). In one embodiment, the irregular pixel fragment footprints are stored in a grid-of-lists structure. The light-space grid 510 is a grid of cells. Each grid cell may correspond to a light-space head pointer which points to a light grid cell list representing pixel fragment footprints falling within the grid cell. In contrast, with a conventional shadow map that stores depth values, a grid cell of a light-space grid 510 stores a pointer to a list of pixel fragment footprints associated with screen-space pixels. In one embodiment, the light grid cell list is a linked-list.

Since pixel fragment footprints can lie anywhere within a grid cell, conservative rasterization should be used to render graphics primitives in a 3D scene in light-space at step 160 and generate the shadow mask buffer using the light-space visibility buffer 525. The graphics primitives should test pixel fragment footprints for occlusion if the graphics primitive intersects or covers any portion of a grid cell (not just the center, as in traditional rasterization).

A grid cell 511 is associated with an index or light-space head pointer which points to a light grid cell list 501. In one embodiment, a light grid cell list includes a list of nodes and a pointer to the next node in the list. Each node represents a pixel fragment footprint. In one embodiment, when each pixel includes N sample locations, a node represents a single sample point. In another embodiment, when each pixel includes N sample locations, a node represents a single pixel with N sample points. In either case, the index, or light-space head pointer, points to the first node in the light grid cell list 501. The light grid cell list 501 includes three nodes storing sample points (or pixels) $P_1$, $P_2$, and $P_3$. A grid cell 512 corresponds to a light-space head pointer which points to a light grid cell list 502. The light grid cell list 502 includes six nodes that store sample points (or pixels) $P_4$, $P_5$, $P_6$, $P_7$, $P_8$, and $P_9$.

Figure 5D:
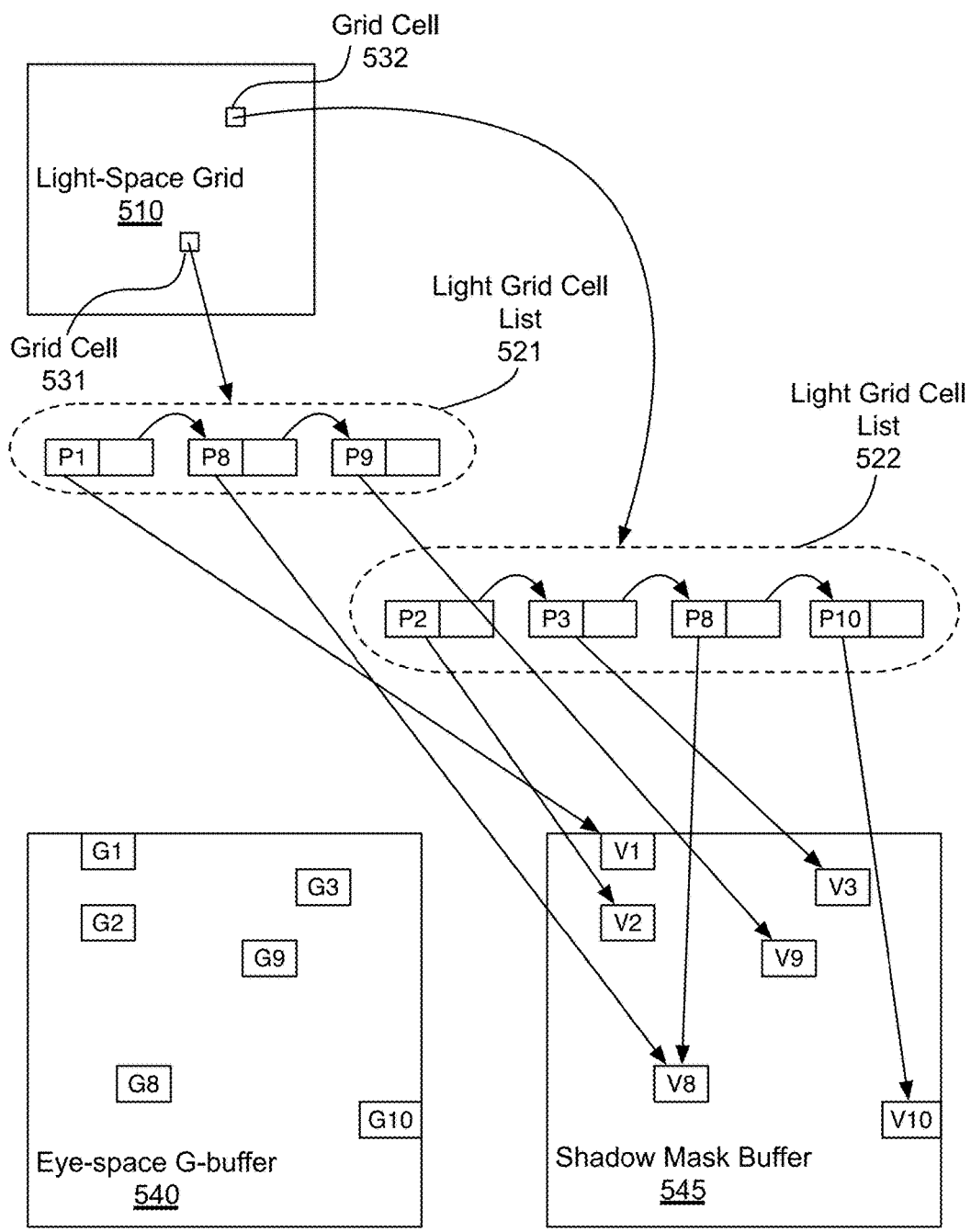
FIG. 5D illustrates the light-space visibility buffer data structure and a corresponding eye-space G-buffer, in accordance with one embodiment.

FIG. 5D illustrates the light-space visibility buffer data structure and a corresponding eye-space G-buffer 540, in accordance with one embodiment. The light-space visibility buffer data structure includes light grid cell lists and a shadow mask buffer 545. A light grid cell list 521 is associated with a particular grid cell in the light-space grid 510, grid cell 531. A light grid cell list 522 is associated with the grid cell 532. The grid cell 531 stores an index to a first node corresponding to sample point $P_1$ in the light grid cell list 521. The grid cell 532 stores an index to a first node corresponding to sample point $P_2$ in the light grid cell list 522. The node data (e.g., visibility data) is stored in a shadow mask buffer 545. In one embodiment, each node in a light grid cell list is two integers, including a next index that points to the next sample point in the light grid cell list and an index to the corresponding eye-space G-buffer pixel sample location in the eye-space G-buffer 540. In another embodiment, each node address is the same as the G-buffer index for the pixel (i.e., the node addresses are directly mapped to the pixels), so each node stores only the next index that points to the next node in the light grid cell list.

In one embodiment, the shadow mask buffer 545 is the same resolution as the display image (e.g., screen resolution) and each location in the shadow mask buffer 545 corresponds to a location in an eye-space G-buffer 540. In other words, an index to a corresponding eye-space G-buffer pixel sample location corresponds directly to a visibility sample stored for the same pixel sample location in the shadow mask buffer 545. In one embodiment, each location in the shadow mask buffer 545 stores a visibility sample, i.e., a binary shadow visibility value for a fragment that covers an eye-space G-buffer pixel sample location. The nodes associated with sample points $P_1$, $P_8$, and $P_9$ in the light grid cell list 521 point to the visibility values $V_1$, $V_8$, and $V_9$, respectively, in the shadow mask buffer 545. The visibility values $V_1$, $V_8$, and $V_9$ correspond to the pixel sample locations $G_1$, $G_8$, and $G_9$, respectively, in the eye-space G-buffer 540. Similarly, the nodes associated with sample points $P_2$, $P_3$, $P_8$, and $P_{10}$ in the light grid cell list 522 point to the visibility values $V_2$, $V_3$, $V_8$, and $V_{10}$, respectively, in the shadow mask buffer 545. The visibility values $V_2$, $V_3$, $V_8$, and $V_{10}$ correspond to the pixel sample locations $G_2$, $G_3$, $G_8$, and $G_{10}$, respectively, in the eye-space G-buffer 540. Note that nodes in different light grid cell lists may point to the same visibility sample in the shadow mask buffer 545, such as nodes $P_8$ in light grid cell lists 521 and 522. When two different objects map to the same pixel in eye-space, nodes in two different light grid cell lists point to the same visibility sample. Two grid cells can also share the same visibility sample when a pixel fragment footprint has multiple samples that project into separate light grid cells.

An eye-space G-buffer 540 is the same resolution as the display image (e.g., screen resolution). In one embodiment, each location in the eye-space G-buffer 540 stores a fragment position in a coordinate space (e.g., eye-space), surface normal vector, and other information needed to reconstruct a pixel-sized quadrilateral or pixel fragment footprint on the fragment's tangent plane at the sample point $\vec{P}_i$. In one embodiment, the pixel fragment footprint is centered on the light ray $\vec{L}_i$ that intersects one or multiple grid cell(s) in the light-space grid 510.

The light-space visibility buffer 525 may be used to generate the shadow mask buffer 545 during rasterization of the scene in light-space. Rasterizing over irregular pixel fragment footprints requires knowing where the pixel fragment footprints occur in screen-space. In one embodiment, a rasterization pre-pass (in eye-space) is used to identify the locations of visible pixel fragments requiring shadow queries. A z-buffer portion of the eye-space G-buffer 540 is generated during the rasterization pre-pass to determine a nearest depth value for each visible pixel fragment in the pixel grid 520. The visible pixel fragments correspond to light samples in the light-space grid 510. The locations of the light samples in the light-space grid 510 are identified by executing a compute pass over the z-buffer, transforming pixel fragments into light-space (via a shadow map transformation) to generate the pixel fragment footprints. The pixel fragment footprints are then inserted into corresponding light-space grid cell lists. In one embodiment, identifiers corresponding with the pixel fragment footprints are inserted into the corresponding light-space grid cell lists. Pseudocode describing the process of a rasterization pre-pass, generation of an IZB that encodes a light-space visibility buffer 525, and generation of shadow map data is shown in Table 1, where the lsTexel object is a grid cell in the light-space grid 510.

TABLE 1

High Level Pseudocode for generating a shadow mask buffer using an IZB

```
// Step 1: Identify locations we need to shadow
G(x, y) ← RenderGBufferFromEye( )
// Step 2: Add these pixels into the light-space data structure (IZB)
```

TABLE 1-continued

High Level Pseudocode for generating a shadow mask buffer using an IZB

```
for pixel p ∈ G(x, y) do
    lsTexel_p ← ShadowMapTransform[ GetEyeSpacePos( p ) ]
    izbNode_p ← CreateIZBNode[ p ]
    AddNodeToLightSpaceList[ lsTexel_p, izbNode_p ]
end for
// Step 3: Determine shadows:
// test each graphics primitive for pixels in covered grid cell list(s)
for primitive t ∈ ScenePrimitives do
    for fragment f ∈ ConservativelyRasterizeInLightSpace( t ) do
        lsTexel_f ← FragmentLocationInRasterGrid [ f ]
        TraversePixelListFromStep2TestingIfPrimitiveShadows[ lsTexel_f ]
    end for
end for
```

As with ray tracing, the key unit of work is ray-primitive intersections. The ray-primitive intersections are spawned as a graphics primitive fragment traverses a list of potentially occluded pixels (i.e., shown as step 3 in Table 1). In contrast with a pixel fragment that covers a pixel, a primitive fragment covers a grid cell. A pixel fragment is generated by rasterizing a graphics primitive in screen-space and a primitive fragment is generated by rasterizing the graphics primitive in light-space. Each light sample represents a ray (from $\vec{P}_i$ along $\vec{L}_i$) that is tested for intersection with the rasterized graphics primitive to produce a primitive fragment. A rasterization pre-pass (i.e., shown as step 1 in Table 1) may be used to reduce shading operations.

Simplistically, the algorithmic complexity is O(N) for N ray-primitive visibility tests. But the value of N depends on the primitive count and the screen resolution. Pixel fragment footprints create nodes, and primitives generate light-space primitive fragments that traverse light grid cell lists of pixel fragment footprints. The screen resolution determines the number of pixel fragment footprints. So $N=t_f l_{izb}$ where $t_f$ is the number of light-space primitive fragments and $(l_{izb})$ is the average light grid cell list length traversed by each primitive fragment.

Therefore, processing performance depends on total ray-primitive tests, number of light-space primitive fragments, and the average length of the light grid cell lists. Additionally, traversing light grid cell lists may cause GPU under-utilization if lengths of the light grid cell lists vary significantly between threads. Therefore, reducing variance of $l_{izb}$ may improve performance for GPU implementations. Increasing light-space grid resolution reduces the average light grid cell list length by distributing pixel fragment footprints over larger numbers of grid cells but also increases the number of light-space primitive fragments generated by rasterization.

Figure 6:
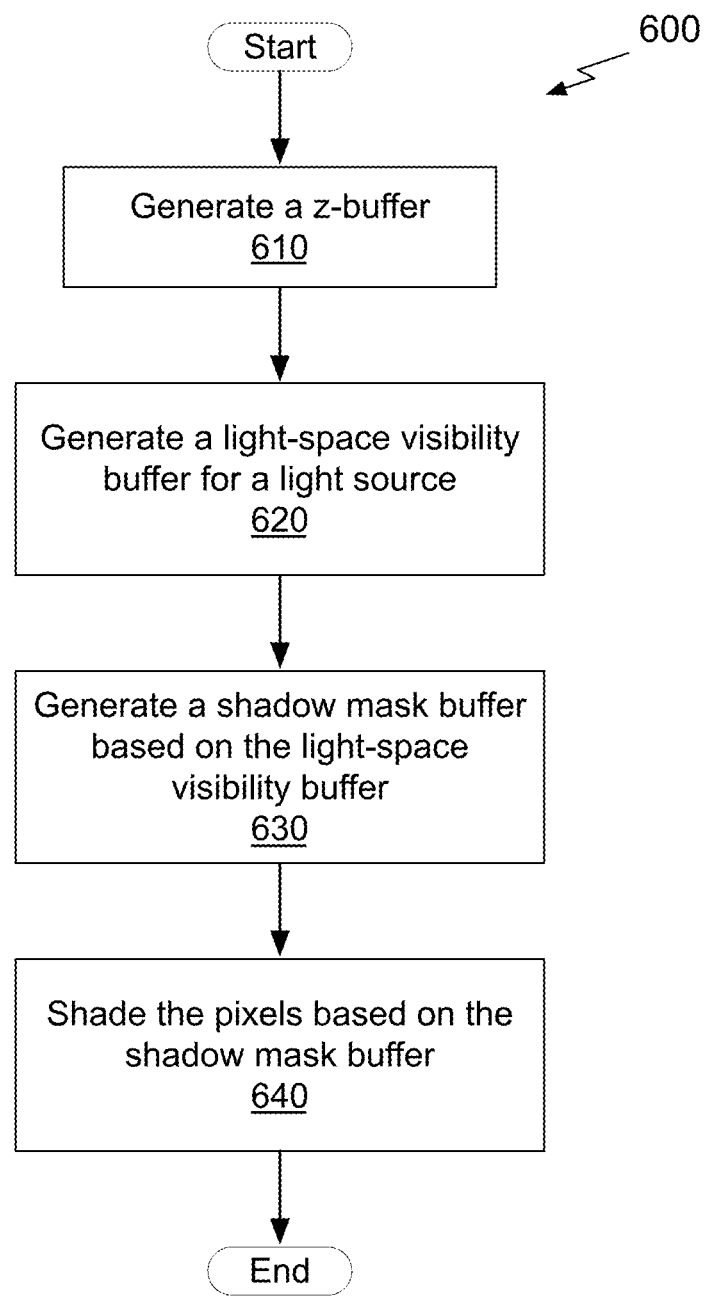
FIG. 6 illustrates a flowchart of a method for rendering sub-pixel shadows, in accordance with one embodiment.

FIG. 6 illustrates a flowchart of a method 600 for rendering shadows, in accordance with one embodiment. At step 610, a rasterization pre-pass is performed to generate a z-buffer in eye-space. Compared with the two-dimensional screen-space, eye-space is a three-dimensional space as viewed from the eye. In one embodiment, step 610 is performed using the pseudocode of step 1 shown in Table 1.

When single sample shadows are used, the z-buffer may store only pixel fragment depths. To produce anti-aliased shadows, intersections with grid cell frustums are determined, as described in more detail in conjunction with FIGS. 7A and 7B, and additional data is needed in the z-buffer. In one embodiment, three additional values are stored in the eye-space G-buffer 540 to define the pixel fragment footprint in light-space. The three additional values may be represented in a floating point format. In another embodiment, the three additional values are not stored in the z-buffer and are instead computed from the normal vector of the pixel fragment.

At step 620, a light-space visibility buffer 525 is generated for a light source 505. In one embodiment, step 620 is performed using the pseudocode of step 2 shown in Table 1. At step 630, a shadow mask buffer 545 is generated based on the light-space visibility buffer 525. In one embodiment, step 630 is performed using the pseudocode of step 3 shown in Table 1.

At step 640, the pixels are shaded based on the shadow mask buffer 545. In one embodiment, pixel data stored in the eye-space G-buffer 540 is processed based on the shadow mask buffer 545 to produce a frame buffer for display. The shadow mask buffer 545 indicates whether each pixel (or sample within a pixel) is in shadow or not. The shadow mask buffer 545 may be used to modulate the color of the pixel.

Frustum Tests for Sub-Pixel Shadows

The light-space visibility buffer 525 can be used to provide pixel accurate shadows when one sample is used for each pixel. Naive extensions may achieve sub-pixel accuracy by increasing the number of samples per pixel and increasing the amount of storage consumed for each buffer because the amount of storage scales linearly with the sample count. To render sub-pixel shadows for anti-aliased or soft shadows, a frustum is traced from the point light source back to a primitive in light-space. Intersections between the frustum and other primitive fragments are directly computed in light-space rather than projecting a sample point on an object in light-space back to a pixel grid 520 in eye-space.

Figure 7A:
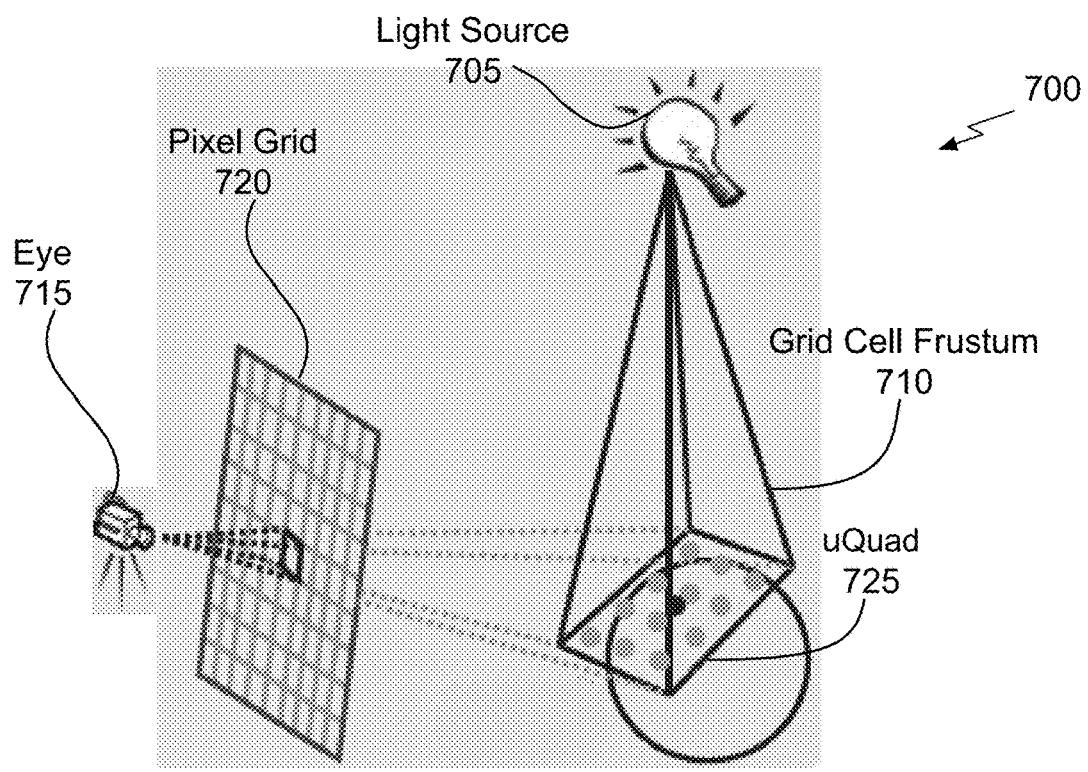
FIG. 7A is a conceptual diagram of grid cell frustum corresponding to a light source to a pixel µQuad, in accordance with one embodiment.

FIG. 7A is a conceptual diagram 700 of grid cell frustum 710 corresponding to a light source to a pixel fragment footprint shown as a pixel µQuad 725, in accordance with one embodiment. A pixel boundary is projected to a fragment tangent plane on an object to define the µQuad 725. The µQuad 725 is a pixel footprint at the tangent plane of a primitive that forms a base of the grid cell frustum 710.

Figure 7B:
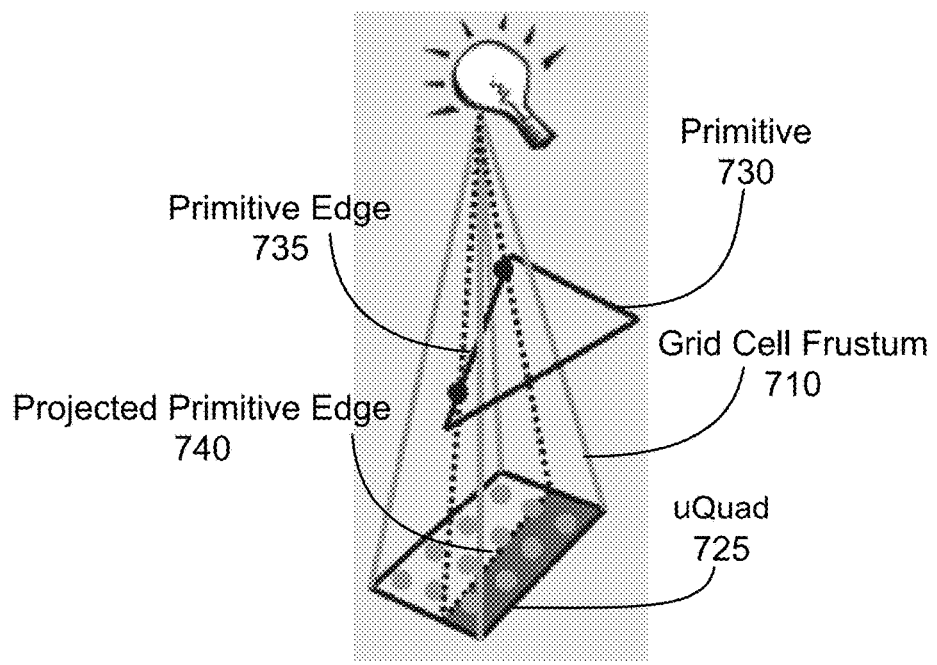
FIG. 7B is a conceptual diagram of a primitive intersecting the grid cell frustum of FIG. 7A, in accordance with one embodiment.

FIG. 7B is a conceptual diagram of a primitive 730 intersecting the grid cell frustum 710 of FIG. 7A, in accordance with one embodiment. The edges (e.g., primitive edge 735) of each potentially occluding primitive, such as primitive 730, are projected to the tangent plane to perform an intersection test. Each projected primitive edge corresponds to a half-plane defining at least a portion of the µQuad 725 that is in shadow. The intersection of the projected primitive edge 740 with the µQuad 725 is then used to determine visibility of each sample within the µQuad 725. The intersection of the projected primitive edges with the µQuad 725 define the primitive fragment.

Each projected primitive edge 740 and the grid cell frustum 710 projected from the light source 705 defines a shadow quad for a triangle primitive 730. The three shadow quads corresponding to the three projected edges and the triangle primitive 730 bound a shadow volume within the grid cell frustum 710. The half-plane results for each edge are combined using a binary AND operation to generate a sample visibility bitmask representing the µQuad 725 samples (and the sub-pixel samples) that are occluded by the primitive 730. The sample visibility bit mask indicates the coverage of the primitive fragment. In one embodiment, the projected primitive edge 740 is used as an index to a lookup table that stores visibility sample values. The locations of the visibility samples may be fixed or programmable. In one embodiment, 64 visibility sample locations are defined within each pixel and within each µQuad 725. The results for each potentially occluding primitive are accumulated for the µQuad 725 to produce the final sample visibility bitmask that is stored in the shadow mask buffer 545 for a pixel.

Using multiple visibility samples per pixel may also require multiple nodes per pixel fragment footprint, up to one node per visibility sample and multiple samples per pixel complicates generation of the light-space visibility buffer 525. Each pixel fragment footprint includes multiple samples that project to a variable number of light-space grid cells, and the pixel fragment footprint should be included in the light grid cell list for the grid cell. In one embodiment, µQuads (i.e., pixel fragment footprints) are rasterized in light-space during step 620. In another embodiment, the size of the light-space visibility buffer 525 is increased to store multiple samples in each µQuad. For example, when a µQuad includes 32 samples, each grid cell is associated with the 32 samples within a single µQuad. In another embodiment, each grid cell is associated with a number of samples that is less than all of the samples in a single µQuad, as described further herein.

Figure 7C:
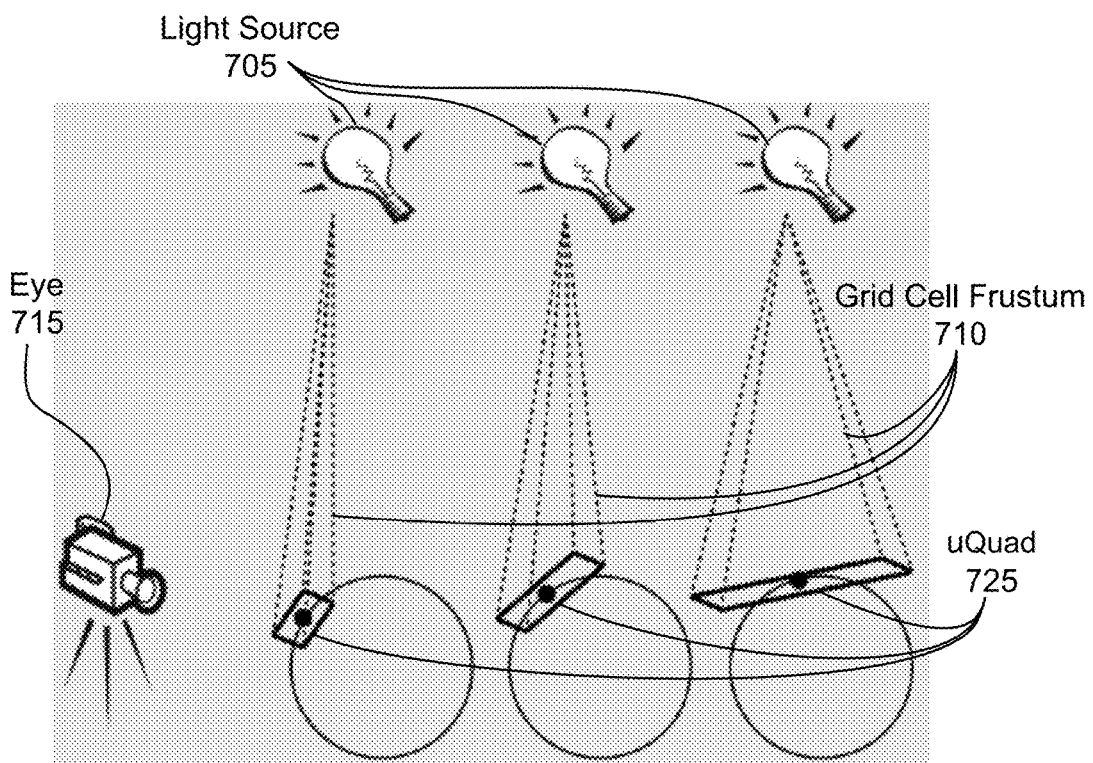
FIG. 7C is a conceptual diagram of grid cell frustum corresponding to a light source projected to a pixel µQuad as a tangent plane of a pixel fragment changes, in accordance with one embodiment.

FIG. 7C is a conceptual diagram of grid cell frustum corresponding to a light source 705 projecting to a pixel µQuad as a tangent plane of a primitive changes, in accordance with one embodiment. As the tangent plane changes orientation, µQuad 725 elongates along only one axis in eye-space as $\vec{N}\cdot\vec{V}\rightarrow 0$ (the other axes depend on screen resolution). Therefore, the µQuad 725 may be sampled one dimensionally. In one embodiment, from one to eight samples are used for each µQuad, depending on the orientation of the particular µQuad. Using a variable sampling rate creates an approximate irregular light-space visibility buffer 525. As µQuads enlarge, some nodes may not be inserted into the light grid cell lists, thereby introducing light leaks for small distant occluding primitives that fall between samples (i.e., that fail to spawn needed frustum-primitive tests). To reduce the number of missed intersection tests that may contribute to light leaks, primitives can be over-conservatively rasterized. In one embodiment, light-space primitives are rasterized with a grid cell dilation equal to one grid cell (rather than a half grid cell in typical conservative rasterization), ensuring primitives touch more sample locations.

Figure 7D:
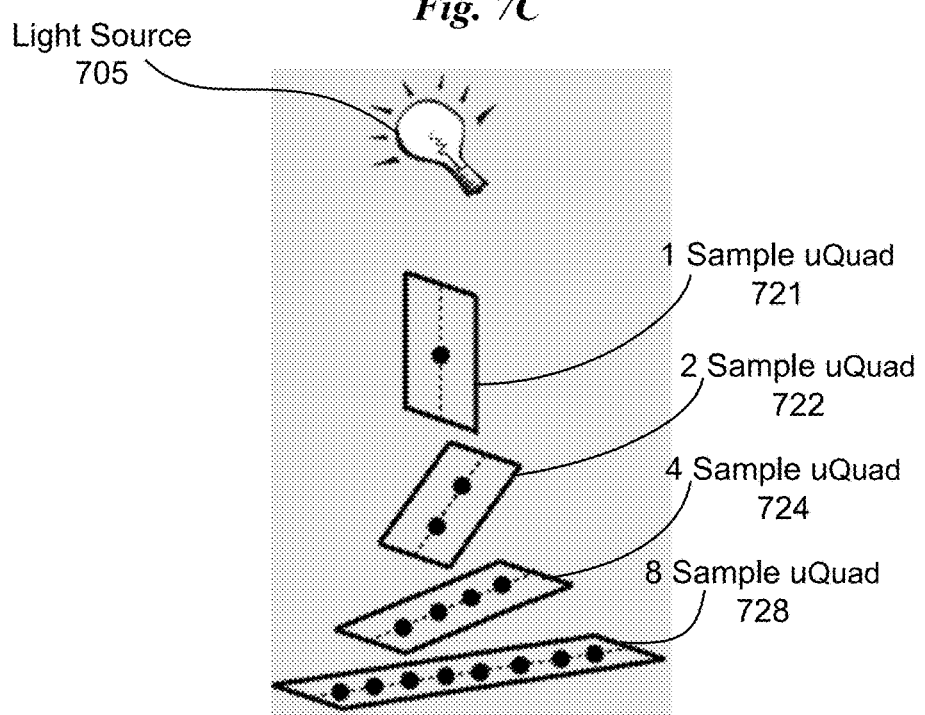
FIG. 7D is a conceptual diagram of sample locations within the pixel µQuad of FIG. 7C as the tangent plane of the pixel fragment changes, in accordance with one embodiment.

FIG. 7D is a conceptual diagram of sample locations within the pixel µQuad 725 of FIG. 7C as the tangent plane of the pixel fragment changes, in accordance with one embodiment. Depending on the tangent plane, the µQuad 725 may be sampled as µQuads 721, 722, 724, or 728, sampling one, two, four, or eight samples, respectively.

Reducing the number of nodes in the light-space visibility buffer 525 directly decreases average list length ($l_{izb}$) of each light grid cell list. While enlarging conservative raster dilation increases a primitive fragment count $t_f$ by a smaller amount. By using the tangent-based sampling to approximate the coverage of pixel fragments, on average two nodes are inserted per pixel compared to eight with an exact approach. Therefore, a four times reduction in ($l_{izb}$) is achieved. Increasing primitive fragment dilation from 0.5 to 1.0 pixels only increases $t_f$ 6-40%. Overall, a net improvement is accomplished when tangent-based sampling is used in combination with conservative rasterization.

As in shadow maps, selecting an appropriate light-space resolution is important. Unlike shadow maps, resolution does not impact quality but it may affect performance. Because the complexity of the light-space visibility buffer 525 is $O(t_f(l_{izb}))$, halving resolution grows the average list length four times while lowering the number of primitive fragments four times. Therefore, resolution seems to minimally impact performance. However, conservative rasterization also generates more primitive fragments, and the effect grows for small primitives and low resolutions. Larger resolutions increase memory consumption of the light grid cell list structure, though the number of nodes is largely invariant with light-space resolution. Overall, closely matching light-space and image resolutions does not increase $l_{lzb}$ while also avoiding having many primitive fragments testing empty light grid cell lists.

As described in conjunction with FIG. 6, the three distinct phases for rendering sub-pixel shadows are generating the light-space visibility buffer 525 data structure, spawning primitive occlusion tests via light-space rasterization, and rendering a final shadowed image. In one embodiment, six passes are performed to render the final shadowed image. Tangent-based sampling may be used during generation of the light-space visibility buffer 525 to reduce the average light grid cell list length. Conservative rasterization may be used for performing the primitive occlusion tests to reduce light leaks.

Figure 7E:
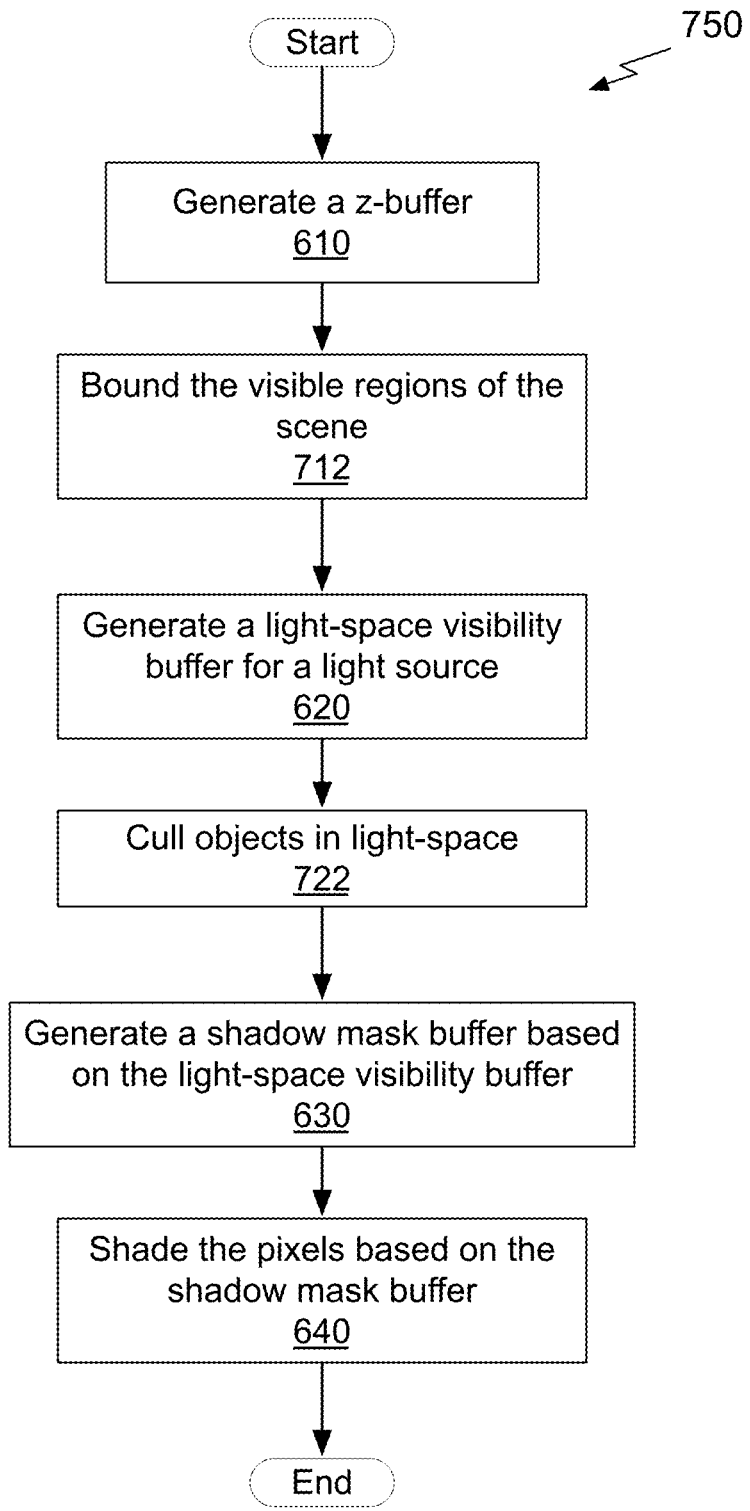
FIG. 7E illustrates another flowchart of a method for rendering sub-pixel shadows, in accordance with one embodiment.

FIG. 7E illustrates another flowchart of a method 750 for rendering sub-pixel shadows, in accordance with one embodiment. The method 750 includes previously described steps 610, 620, 630, and 640 shown in FIG. 6. The method 750 includes additional steps 712 and 722.

When single sample shadows are used, the z-buffer generated at step 610 may store only pixel fragment depths. To produce anti-aliased shadows, additional data is needed in the z-buffer to determine intersections of primitives with the grid cell frustums at step 630. In one embodiment, three additional values are stored in the eye-space G-buffer 540 to define the pixel fragment footprint in light-space. The three additional values may be represented in a floating-point format. In another embodiment, the three additional values are not stored in the z-buffer and are instead computed from the normal vector of the pixel fragment.

At step 712, the scene's visible regions are bounded. As with shadow maps, a priori knowing the correct settings for the grid cell frustum 710 is challenging. To avoid poorly bounding the scene, in one embodiment the projection matrix for the light source 705 is computed for each frame to tightly bound geometry that is visible according to the z-buffer. A single thread may be allocated to perform step 712 by executing a shader program over the z-buffer.

During step 620, the light-space visibility buffer 525 is generated and, in one embodiment, nodes corresponding to pixel fragment footprints that are trivially shadowed are not added to a light grid cell list. Pixel fragment footprints having $\vec{N} \cdot \vec{V} \leq 0$ may be considered trivially shadowed when standard lighting models are used. The shadow mask value for the trivially shadowed pixel fragment footprints may be left fully lit because those pixels will be shadowed based on the normal and view ray. Shadowing pixels based on the normal and view rays may avoid a common problem along light silhouettes where geometric and shading normal vectors provide different shadow terms.

At step 722, light-space culling is performed to cull primitive fragments that intersect a grid cell that has an empty light grid cell list. Additionally, primitive fragments that fall behind the furthest node in the light grid cell list may be culled. The early-z circuitry can accelerate the light-space culling process. To use early-z circuitry, a light-space z-buffer is generated. In one embodiment, a stencil is created by setting depth to zero in grid cells with empty light grid cell lists and setting the distance to the furthest node in light grid cell lists that are not empty. Using light-space culling may provide a substantial speedup of 30-50%.

During step 630 when visibility tests are performed, a pixel often becomes fully occluded. Primitives rasterized later in the frame can have no additional impact, so spawning additional frustum-primitive tests is wasteful. In one embodiment, occluded pixels are removed from the light grid cell lists by removing the nodes corresponding to the occluded pixels. Importantly, node removal requires no atomic operations. Race conditions can occur, but at worst the race conditions cause extra visibility tests on already-occluded pixels (after which node removal is reattempted). Node removal may provide a 10-15% performance improvement despite additional logic and memory operations.

Software pipelining may be used to overlap the loading of node data with visibility testing. When traversing a list of nodes in a light grid cell list, the next node is loaded and G-buffer coordinates are computed while the current node is tested. Overlapping the operations hides latency and may improve speed 5-15%.

Spawning and performing visibility tests during step 630 may consume significant processing resources. Objects partially covering a grid cell may occlude an arbitrary subset of the light grid cell list associated with the grid cell. Each primitive fragment traverses the light grid cell list. During traversal, each node in the light grid cell list is read, a visibility test is performed, and the result is atomically ORed into a visibility mask stored in the shadow mask buffer 545. A key bottleneck stems from thread divergence during the list traversal. Because the different light grid cell lists typically have different lengths, some threads that have shorter light grid cell lists wait on adjacent threads that have longer light grid cell lists. In some cases, the variation in length may be as great as 1:1000.

A cascade technique based on sample distribution shadow maps (SDSMs) may be used to better balance the thread workloads by partitioning portions of the light-space grid 510 into different regions. The number of grid cells in each region typically varies, so that the grid cells in each region have light grid cell lists of similar length. The entire scene may be split into multiple cascades with logarithmic partitioning that individually bounds each cascade. A separate light-space visibility buffer 525 may be generated for each cascade. Creation of cascaded light-space visibility buffers 525 for single sample shadows easily occurs in parallel (because cascades contain unique pixels). Cascades for multi-sample shadows should overlap slightly to avoid light leaks along boundaries. Light-space rasterization needs to occur over each light-space visibility buffer 525 to accumulate full visibility. Culling primitives separately for each grid cell frustum or using a single render pass to route primitives to the appropriate cascade may improve performance. Except for complex models that naturally fit in one grid cell frustum, cascades' significant reduction in thread divergence often makes up for the overhead of rasterizing primitives multiple times.

Finally, during step 630, updates to the shadow mask buffer 545 are a synchronization point when multiple threads may be testing visibility for different primitive fragments at the same pixel fragment footprint. The shadow mask buffer 545 should be updated atomically to combine results and avoid races. To reduce contention, in one embodiment, updates to the shadow mask buffer 545 should only occur if a primitive fragment changes the existing visibility. The previous shadow mask value should be read beforehand to determine if the updated shadow mask value is different, and the avoided contention may provide up to a 14% speed boost.

Figure 8:
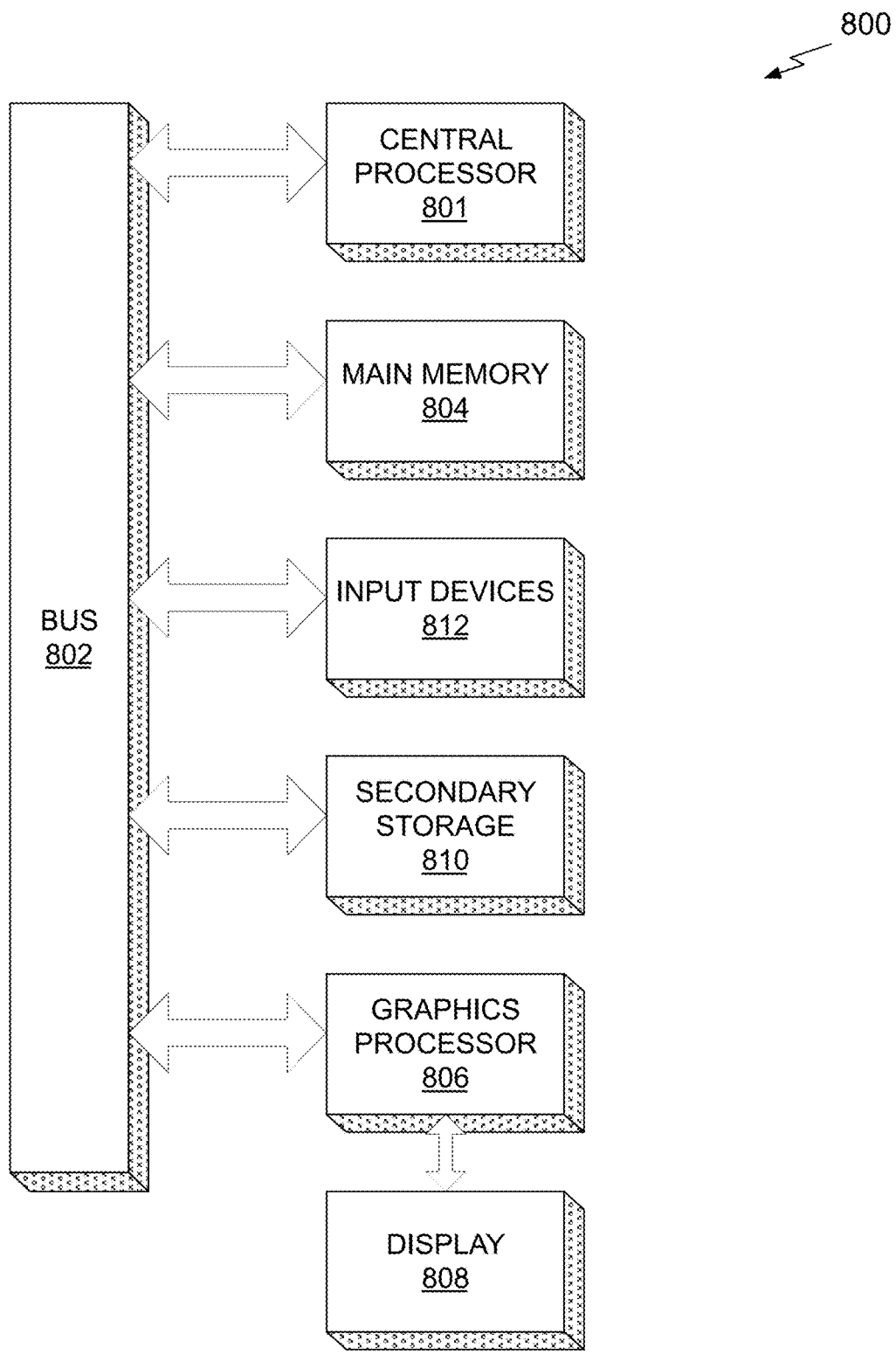
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
defining a frustum projected from a grid cell corresponding to a light source in light-space;
determining that a graphics primitive intersects the frustum;
accessing a light-space visibility buffer to obtain a set of pixel fragment footprints corresponding to the frustum, wherein a first pixel fragment footprint of the pixel fragment footprints forms a base of the frustum and a number of samples within the first pixel fragment footprint is based on an orientation of a tangent plane of a second graphics primitive;
identifying whether each pixel fragment footprint of the pixel fragment footprints is shadowed by the graphics primitive; and
rendering, by a parallel processing unit, a final shadowed image including the set of pixel fragment footprints for display on a display device.

2. The method of claim 1, further comprising updating a shadow mask buffer for each of the pixel fragment footprints that is shadowed by the graphics primitive.

3. The method of claim 1, wherein the number of samples increases as the pixel fragment footprint becomes longer in light-space.

4. The method of claim 1, further comprising:
generating a z-buffer for a scene including the graphics primitive and the light source;
bounding visible regions of the scene based on the z-buffer; and
culling graphics primitives that out outside of the visible regions.

5. The method of claim 1, wherein the set of pixel fragment footprints comprises pixels covered by graphics primitives that map to the grid cell in light-space.

6. The method of claim 1, wherein the set of pixel fragment footprints is stored as a linked list.

7. The method of claim 1, wherein the light-space visibility buffer is generated by:
transforming pixel fragments from screen-space to light-space to generate the pixel fragment footprints;
determining a location within the grid cell that maps to the pixel fragment footprints; and
storing identifiers of the pixel fragment footprints in the location of the light-space visibility buffer.

8. The method of claim 1, further comprising:
identifying a furthest pixel fragment footprint in the set of pixel fragment footprints; and
culling primitive fragments that fall behind the furthest pixel fragment footprint.

9. The method of claim 1, wherein the light-space visibility buffer corresponds to a first portion of a light-space grid that includes the grid cell and a second light-space visibility buffer corresponds to a second portion of the light-space grid.

10. The method of claim 9, wherein the first portion of the light-space grid is smaller than the second portion of the light-space grid.

11. A method, comprising:
   defining a frustum projected from a grid cell corresponding to a light source in light-space;
   determining that a graphics primitive intersects the frustum;
   accessing a light-space visibility buffer to obtain a set of pixel fragment footprints corresponding to the frustum;
   identifying whether each pixel fragment footprint of the pixel fragment footprints is shadowed by the graphics primitive;
   determining a second grid cell corresponds to a second set of pixel fragment footprints that is empty;
   culling primitive fragments that intersect a second frustum associated with the second grid cell in light-space; and
   rendering, by a parallel processing unit, a final shadowed image including the set of pixel fragment footprints for display on a display device.

12. A method, comprising:
   defining a frustum projected from a grid cell corresponding to a light source in light-space;
   determining that a graphics primitive intersects the frustum;
   accessing a light-space visibility buffer to obtain a set of pixel fragment footprints corresponding to the frustum;
   identifying whether each pixel fragment footprint of the pixel fragment footprints is shadowed by the graphics primitive, wherein a pixel fragment footprint is shadowed by the graphics primitive when a combination of half-plane intersections produced by projected edges of the graphics primitive indicate at least one sample within the pixel fragment footprint is covered; and
   rendering, by a parallel processing unit, a final shadowed image including the set of pixel fragment footprints for display on a display device.

13. The method of claim 12, wherein the identifying comprises:
   testing only one sample for a first pixel fragment footprint in the set of pixel fragment footprints for being shadowed by the graphics primitive; and
   test more than one sample for a second fragment footprint in the set of pixel fragment footprints for being shadowed by the graphics primitive.

14. A non-transitory computer-readable storage medium storing instructions that, when executed by a processor, cause the processor to perform steps comprising:
   defining a frustum projected from a grid cell corresponding to a light source in light-space;
   determining that a graphics primitive intersects the frustum;
   accessing a light-space visibility buffer to obtain a set of pixel fragment footprints corresponding to the frustum;
   identifying whether each pixel fragment footprint of the pixel fragment footprints is shadowed by the graphics primitive, wherein a pixel fragment footprint is shadowed by the graphics primitive when a combination of half-plane intersections produced by projected edges of the graphics primitive indicate at least one sample within the pixel fragment footprint is covered; and
   rendering, by a parallel processing unit, a final shadowed image including the set of pixel fragment footprints for display on a display device.

15. The non-transitory computer-readable storage medium of claim 14, further comprising updating a shadow mask buffer for each of the pixel fragment footprints that is shadowed by the graphics primitive.

16. The non-transitory computer-readable storage medium of claim 14, wherein a first pixel fragment footprint of the pixel fragment footprints forms a base of the frustum.

17. The non-transitory computer-readable storage medium of claim 14, wherein the identifying comprises:
   testing only one sample for a first pixel fragment footprint in the set of pixel fragment footprints for being shadowed by the graphics primitive; and
   test more than one sample for a second fragment footprint in the set of pixel fragment footprints for being shadowed by the graphics primitive.

18. A system, comprising:
   a memory configured to store a light-space visibility buffer; and
   a parallel processing unit configured to:
   define a frustum projected from a grid cell corresponding to a light source in light-space;
   determine that a graphics primitive intersects the frustum;
   access the light-space visibility buffer stored in the memory to obtain a set of pixel fragment footprints corresponding to the frustum; and
   identify whether each pixel fragment footprint each of the pixel fragment footprints is shadowed by the graphics primitive, wherein a pixel fragment footprint is shadowed by the graphics primitive when a combination of half-plane intersections produced by projected edges of the graphics primitive indicate at least one sample within the pixel fragment footprint is covered; and
   render a final shadowed image including the set of pixel fragment footprints for display on a display device.

19. The system of claim 18, wherein the identifying comprises:
   testing only one sample for a first pixel fragment footprint in the set of pixel fragment footprints for being shadowed by the graphics primitive; and
   test more than one sample for a second fragment footprint in the set of pixel fragment footprints for being shadowed by the graphics primitive.

20. A system, comprising:
   a memory configured to store a light-space visibility buffer; and
   a parallel processing unit configured to:
   define a frustum projected from a grid cell corresponding to a light source in light-space;
   determine that a graphics primitive intersects the frustum;
   access the light-space visibility buffer stored in the memory to obtain a set of pixel fragment footprints corresponding to the frustum;
   identify whether each pixel fragment footprint each of the pixel fragment footprints is shadowed by the graphics primitive wherein a first pixel fragment footprint of the pixel fragment footprints forms a base of the frustum and a number of samples within the first pixel fragment footprint is based on an orientation of a tangent plane of a second graphics primitive; and
   render a final shadowed image including the set of pixel fragment footprints for display on a display device.

* * * * *